United States Patent
Kim (10) Patent No.: US 8,886,160 B2
(45) Date of Patent: Nov. 11, 2014

(54) SYSTEM, TERMINAL, AND METHOD FOR PROVIDING A SERVICE USING NEAR FIELD COMMUNICATION

(75) Inventor: Hyuk Rai Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 107 days.

(21) Appl. No.: 13/612,524

(22) Filed: Sep. 12, 2012

(65) Prior Publication Data

US 2013/0072118 A1  Mar. 21, 2013

(30) Foreign Application Priority Data

Sep. 19, 2011 (KR) .......................... 10-2011-0094151

(51) Int. Cl.
*H04M 11/00* (2006.01)
*H04W 4/20* (2009.01)
*H04W 4/00* (2009.01)

(52) U.S. Cl.
CPC ................ *H04W 4/20* (2013.01); *H04W 4/008* (2013.01)
USPC ........... 455/405; 455/406; 455/41.1; 379/111

(58) Field of Classification Search
CPC .................................. G08C 17/02; H04B 5/00
USPC ......... 455/405, 406, 41.1, 41.2, 404.2, 414.1, 455/414.2; 379/111, 112.06, 112.07
See application file for complete search history.

(56) References Cited

U.S. PATENT DOCUMENTS

| | | | |
|---|---|---|---|
| 8,023,425 B2 * | 9/2011 | Raleigh | 370/252 |
| 2007/0164708 A1 * | 7/2007 | Jiang | 320/132 |
| 2011/0136429 A1 | 6/2011 | Ames et al. | |
| 2014/0024340 A1 * | 1/2014 | Raleigh | 455/406 |
| 2014/0028449 A1 * | 1/2014 | Sigal et al. | 340/12.5 |

FOREIGN PATENT DOCUMENTS

KR   1020090120283   11/2009

* cited by examiner

*Primary Examiner* — Minh D Dao
(74) *Attorney, Agent, or Firm* — H.C. Park & Associates, PLC (57) ABSTRACT

A terminal includes a data receiving unit to receive data from a first target terminal via near field communication (NFC); and a data processing unit to process service information from the data received from the data receiving unit. A method includes establishing a connection via NFC; receiving data via NFC; determining if a service is provided from the data; if a service is provided, determining if a service usage history information update is set; and if a service usage history information update is set, updating the service information of the provided service; and if the service usage history update is not set, initializing the service information. A system includes a terminal with NFC capability; a first target terminal with NFC capability, wherein the first target terminal provides the service.

18 Claims, 5 Drawing Sheets

SYSTEM, TERMINAL, AND METHOD FOR PROVIDING A SERVICE USING NEAR FIELD COMMUNICATION

CROSS-REFERENCE TO RELATED APPLICATION

This application claims priority from and the benefit under 35 U.S.C. §119(a) to Korean Patent Application No. 10-2011-0094151, filed on Sep. 19, 2011, which is hereby incorporated by reference for all purposes as if fully set forth herein.

BACKGROUND

1. Field

Exemplary embodiments of the present invention relate to a system, terminal and method for providing a service from a service provider using near field communication.

2. Discussion of the Background

A Near field communication (NFC) module may be provided along with a mobile terminal. NFC allows for information to be transmitted from a mobile terminal to a NFC target, thus allowing communication between the mobile terminal and the target.

Korean Patent Publication No. 10-2009-0120283, entitled "Shop Management Platform and Providing Method for Shop Management Service", discloses a method for accessing a mobile terminal of a user via short-range wireless communication and transmitting payment approval information to the mobile terminal by using card information obtained from a payment card, searching mobile terminals located within a certain area using short-range wireless communication, and transmitting push contents such as sales promotion information, coupon information, and survey data to the searched mobile terminals.

This method may provide product payment information and a sales promotion list to NFC targets via short-range wireless communication. However, many servers may be used to provide service to the various NFC targets, and thus, it may be difficult to provide an integrated service for products and payments.

SUMMARY

Exemplary embodiments of the present invention provide a system, terminal and method for providing a service from a service provider. Specifically, the system, terminal, and method may be implemented in either a provider of a service or a receiver of a service. The service may be provided by multiple terminals, and sourced by one server.

Additional features of the invention will be set forth in the description which follows, and in part will be apparent from the description, or may be learned by practice of the invention.

An exemplary embodiment of the present invention discloses a terminal, including: a data receiving unit to receive data from a first target terminal via near field communication (NFC); and a data processing unit to process service information from the data received from the data receiving unit, wherein if the NFC unit communicates with the first target terminal, the data processing unit updates the service information.

An exemplary embodiment of the present invention discloses a method for communicating data via near field communication (NFC), including: establishing a connection via NFC; receiving data via NFC; determining if a service is provided from the data; if a service is provided, determining if a service usage history information update is set; if a service usage history information update is set, updating the service information of the provided service; and if the service usage history information update is not set, initializing the service information An exemplary embodiment of the present invention discloses a system to provide a service from a service provider, the system comprising: a terminal with near field communication (NFC) capability; a first target terminal with NFC capability, wherein the first target terminal provides the service, wherein the terminal communicates with the first target terminal via NFC, and receives the service from the first target terminal via NFC, and updates a service information associated with the service.

It is to be understood that both the forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
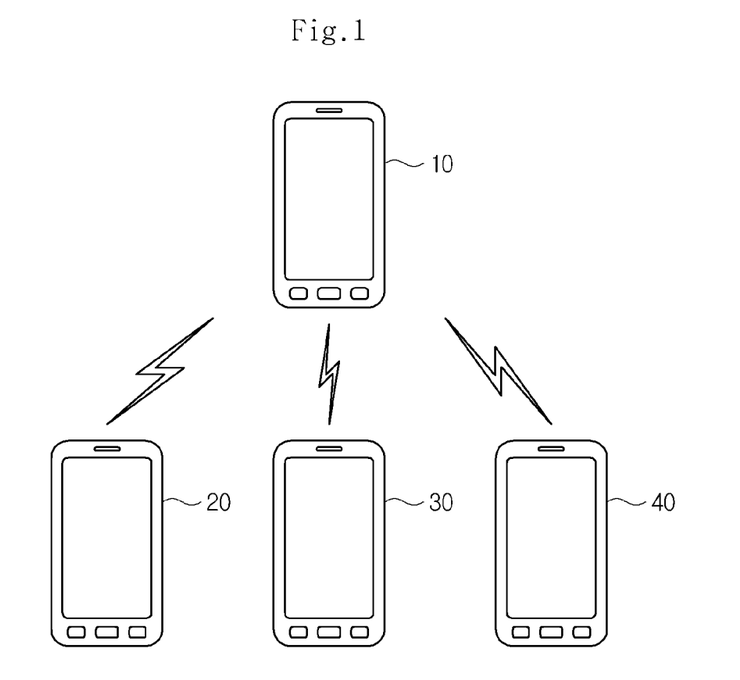
FIG. 1 is a schematic view illustrating a data communication system according to an exemplary embodiment of the present invention.

FIG. 1 is a schematic view illustrating a data communication system according to an exemplary embodiment of the present invention.

Referring to FIG. 1, a data communication system according to an embodiment of the present disclosure includes a near field communication (NFC) terminal 10 and various NFC target terminals 20, 30 and 40.

The NFC terminal 10 includes an NFC module to facilitate NFC with another NFC capable terminal.

The NFC target terminals 20, 30 and 40 may provide services and data transmission to the NFC terminal 10, and other NFC capable devices, via NFC. The NFC target terminals 20, 30 and 40 may act as a service provider. For example, the NFC target terminals 20, 30 and 40 may accept payment using NFC, and be installed at an entry of a subway, accept payment at an exit of a parking lot, or the like. The NFC target terminals 20, 30, and 40 may be situated at various locations, such as at an apartment complex, a department store, or any area or location where a service is provided and a payment is attached with the service.

The NFC terminal 10 exchanges prototype service-associated information through communication protocols between the NFC terminal 10 and each NFC target terminal 20, 30 and 40, thus allowing for the integration and management of a history of interaction without the use of a separate server.

There may be several service providers. However, in the case where a service provider provides its service through various NFC target terminals, such as NFC target terminals 20, 30 and 40, and NFC terminal 10 uses the service, the history of the service may be updated at the NFC terminal 10, with service-associated information being stored along with the history.

Figure 2:
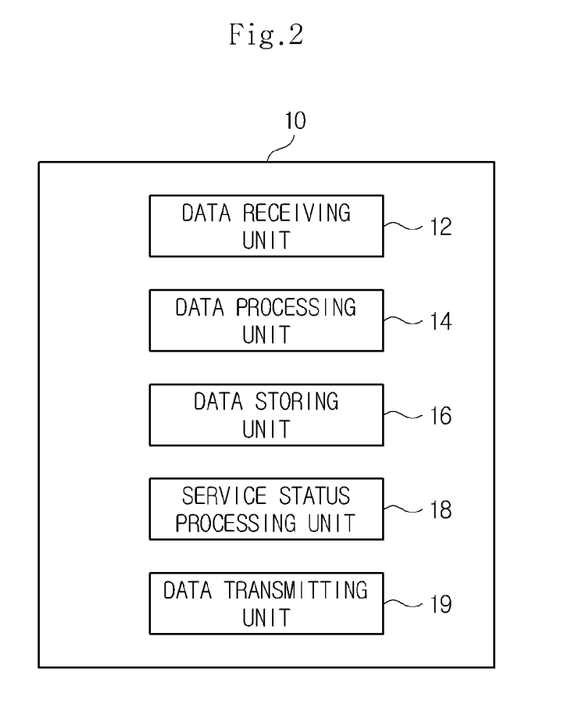
FIG. 2 is a schematic view illustrating a NFC terminal according to an exemplary embodiment of the present invention.

FIG. 2 is a schematic view illustrating a NFC terminal according to an exemplary embodiment of the present invention.

Referring to FIG. 2, the NFC terminal 10 includes a data receiving unit 12, a data processing unit 14, a data storing unit 16, a service status processing unit 18, and a data transmitting unit 19.

The data receiving unit 12 receives data from various NFC target terminals via NFC. The data receiving unit 12 exchanges information with a first NFC target terminal, and receives a first data item ("first data"), and exchanges information with a second NFC target terminal, and receives a second data item ("second data"). The first data and second data each contain information including terminal ID information and service-associated information of the source NFC target terminal.

The data processing unit 14 processes the first data input to the data receiving unit 12 and may update the first data based on the second data. This updating may occur later, for example, after the NFC terminal 10 interacts with the second NFC target terminal, thereby generating the second data. The data processing unit 14 analyzes a list of provided services (including information such as a product list) in the received data to check available services, and processes available service information.

The data storing unit 16 stores the first data and also stores any updates to the first data based on the second data.

The service status processing unit 18 manages the service status information and useable time of the updated first data.

The service status processing unit 18 analyzes the service status information and the service time management information associated with available service information processed by the data processing unit 14, and processes the available service or services, and the service useable time.

The data transmitting unit 19 transmits the data processed by the data processing unit 14 to an NFC target terminal.

Figure 3:
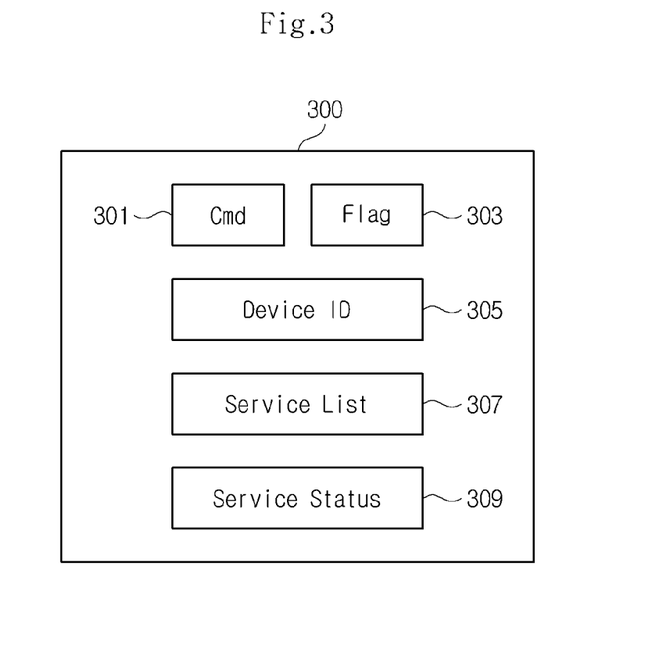
FIG. 3 is a diagram illustrating service information according to an exemplary embodiment of the present invention.

FIG. 3 is a diagram illustrating service information according to an exemplary embodiment of the present invention.

The NFC terminal and the NFC target terminal exchange service-associated information 300. The service-associated information 300 includes 'Cmd (301)' (a region storing commands for processing, such as reading and writing), 'Flag (303)' (an authority status), 'Device ID (305)' (inherent IDs of the NFC terminal and the NFC target terminal), 'Service List (307)' (service and product lists provided by the service provider through the NFC target terminal), and 'Service Status (309)' (service availability of the service provider and service useable time).

Figure 4:
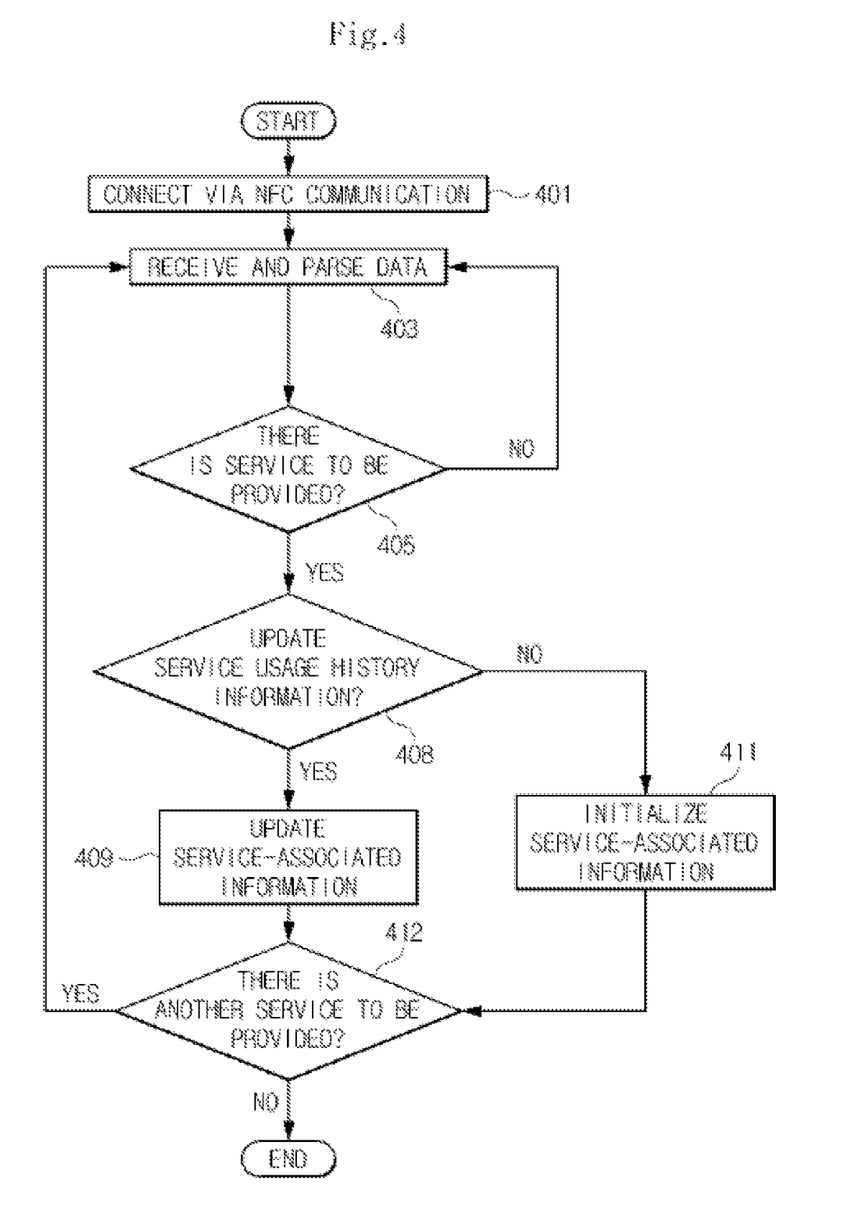
FIG. 4 is a flowchart illustrating a method for communicating data according to an exemplary embodiment of the present invention.

FIG. 4 is a flowchart illustrating a method for communicating data according to an exemplary embodiment of the present invention.

First, the NFC terminal and the NFC target terminal connect to each other via NFC (401). If connection is made via NFC, the NFC target terminal transmits an ID of a service provider and its ID to the NFC terminal, and the NFC terminal transmits its ID information to the NFC target terminal.

The NFC terminal and the NFC target terminal respectively receive data and parse and analyze the data (403). The NFC target terminal transmits a service item list to the NFC terminal.

The NFC terminal determines whether there is service associated with the transmitted or received data (405).

If it is determined that there is a service to be provided (405), a request to a user is made whether to update service usage history information (408). An update of the service usage history information refers to the NFC terminal and a plurality of NFC target terminals that may provide a service via NFC, with each service use reflecting or causing an update to the service-associated information.

If service usage history information is updated (409), a determination is made as to whether there is another service to be provided (412). If yes, the process returns to Operation 403 to receive and parse data. If no, the process is completed.

In the case where a user selects not to update the service usage history information in Operation 408, the service-associated information is initialized (411), and the process proceeds to Operation 412. Thus, in this case, service information may not be updated based on a combination of current service information with previous service information.

Initializing service information or service-associated information may refer to resetting or not updating the service information based on previously stored service information.

Figure 5:
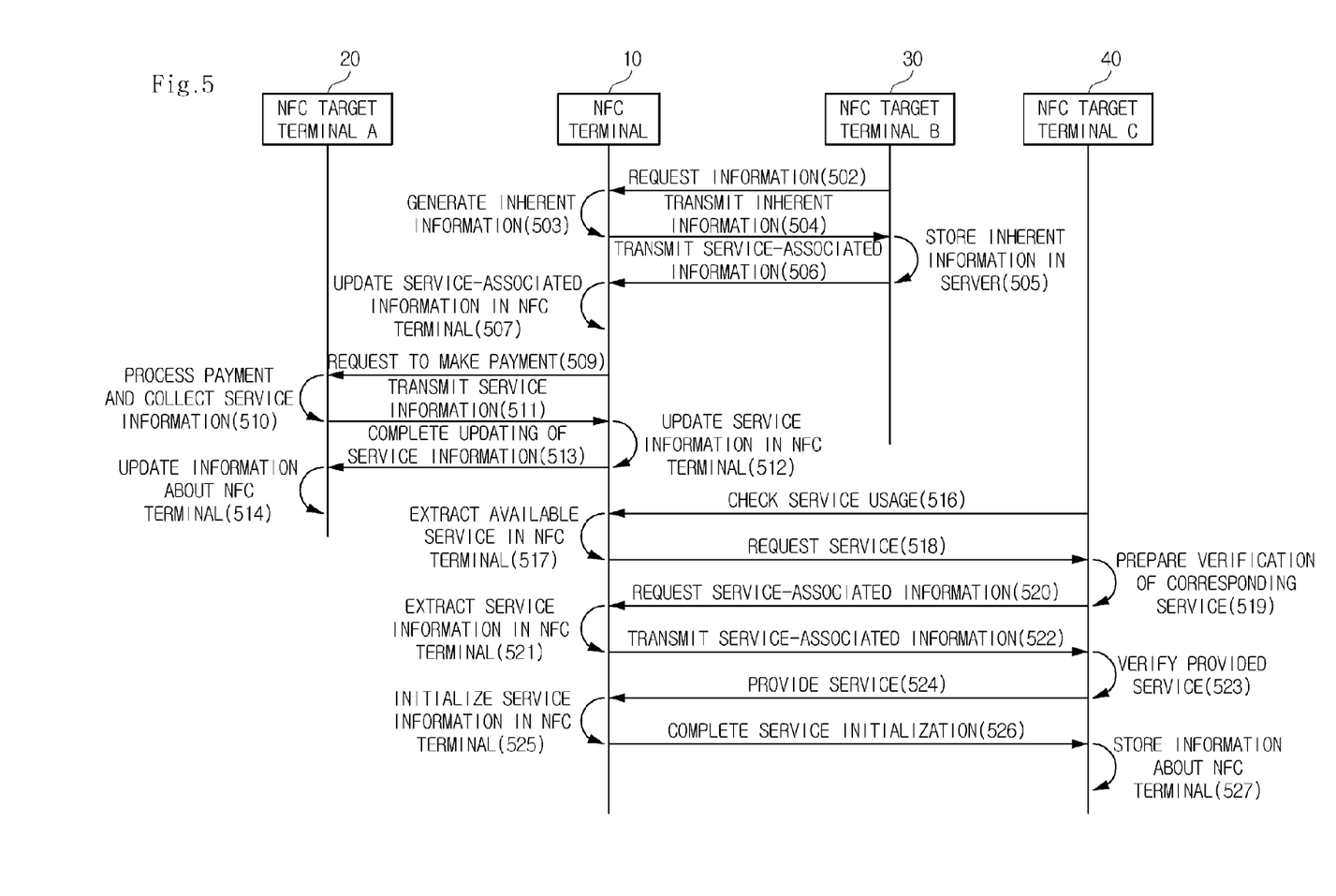
FIG. 5 is a diagram illustrating a method for communicating data according to an exemplary embodiment of the present invention.

FIG. 5 is a diagram illustrating a method for communicating data according to an exemplary embodiment of the present invention.

The NFC target terminals 20, 30 and 40 are terminals that provide a service of a service provider. For example, each NFC target terminal 20, 30 and 40 may provide a service via the NFC terminal 10 to users in a single location, such as a department store.

Specifically, the NFC target terminal B 30 may be a terminal located at the entrance of a department store, the NFC target terminal A 20 may be a payment terminal at a shop in the department store, and the NFC target terminal C 40 may be a specific service providing terminal located in the department store.

If a user of the NFC terminal 10 enters a department store and approaches the NFC target terminal B 30, the NFC target terminal B 30 and the NFC terminal 10 may connect to each other via NFC.

The NFC target terminal B 30 requests inherent information of the NFC terminal 10 (502), the NFC terminal 10 generates its inherent information (503), and the NFC terminal 10 transmits its inherent information, such as an ID of the terminal, to the NFC target terminal B 30 (504).

The NFC target terminal B 30 receives the inherent information of the NFC terminal 10, stores the inherent information of the NFC terminal 10 in the server (505), and transmits the service-associated information to the NFC terminal 10 (506). The NFC terminal 10 receives the service-associated information, accepts service, and may incorporate information to update the service-associated information in the NFC terminal 10 (507).

The user entering the department store may buy an object at the store. The NFC terminal A 20 may be a payment terminal of the store. If a user of NFC terminal 10 approaches an NFC target terminal A 20 and connects via NFC, a request to make payment (509) may be transmitted from NFC terminal 10 to NFC target terminal A 20.

The NFC target terminal A 20 receives the request for payment, and collects service information, such as product information, price, additional services, or the like, that may be applicable to the current transaction (510), and transmits the service information to the NFC terminal 10 (511).

The NFC terminal 10 updates the service information (512), and transmits the updated service information to the NFC target terminal A 20 (513). The NFC target terminal A 20 receives the updated service information, and updates relevant information of the NFC terminal (514).

The NFC terminal 10 updates the service-associated information stored therein by reflecting the payment result.

While shopping in the department store, the user may accept a specific service by using the NFC terminal 10. The NFC target terminal C 40 may be prepared in advance in the department store.

If the user of the NFC terminal 10 approaches the NFC target terminal C 40, the two terminals connect to each other by NFC. The NFC target terminal C 40 transmits a NFC service list currently available to the NFC terminal 10, so the NFC terminal 10 may check whether or not to use service (516).

The NFC terminal 10 receiving the NFC service list compares the received service list with the service list, which may be previously stored in the NFC terminal 10, and thus may extract useable services (517), or requests a specific service to the NFC target terminal C 40 (518). The NFC target terminal C 40 prepares verification of the corresponding service (519), and requests service-associated information required for verification to the NFC terminal 10 (520).

The NFC terminal 10 retrieves service information in the terminal (521), and transmits the service-associated information to the NFC target terminal C 40 (522). The NFC target terminal C 40 verifies the service or services that may be provided based on the transmitted service-associated information (523), and provides service information to the NFC terminal (524).

The NFC terminal 10 initializes the received service information in its terminal (525), and transmits the service information to the NFC target terminal C 40 (526). The NFC target terminal C 40 receives the initialized service information, and stores this information (527).

Thus, based on above, the NFC terminal 10 may dynamically update its service information and interactions based on its service information without an intervening server to perform this task, and therefore service provided from a plurality of NFC target terminal may be accessed and used.

In particular, this disclosure may be used in a parking environment. A user of the NFC terminal 10 may interact with NFC target terminals 20, 30 and 40 installed at various locations of a parking structure. The NFC target terminal B 30 is a terminal installed at the entrance of a parking lot, the NFC target terminal C 40 is a terminal installed at the exit of the parking lot, and the NFC target terminal A 20 is a payment terminal installed at another location of the parking lot.

If the user of NFC terminal 10 is in the parking lot and approaches the NFC target terminal B 30, the NFC terminal 10 combines inherent information associated with the terminal (e.g., phone number, IMEI, or the like) and situation information (e.g., current weather, current time, current location, or the like) and transmits the information to the NFC target terminal B 30 via NFC.

The NFC target terminal B 30 stores the information of the NFC terminal 10, and provides the user with a product list, a service list, basic service, or the like. The NFC target terminal B 30 may provide current time information and its terminal information to the NFC terminal 10 so that the information may be used as an evidence for service when the NFC terminal 10 approaches another target terminal. For example, if the NFC terminal 10 pays at NFC target terminal B 30, and the NFC terminal 10 approaches another target terminal at another exit, the NFC terminal 10 has a record of making a payment.

For example, if a user of NFC terminal 10 approaches NFC target terminal A 20, and the user buys an object being sold at the location where NFC target terminal A 20 is located, and attempts to pay via NFC, the NFC target terminal A 20 checks information of the object to be bought, and checks services (e.g., a parking ticket, a discount ticket, or the like) according to the corresponding item, and provides the service to NFC terminal 10. The NFC terminal 10 receives the service, and updates service information via NFC.

The user passes through the NFC target terminal C 40 at the exit of the parking lot. The user may pay a parking-related fee when passing through the NFC target terminal C 40. At this time, the user may exit free of charge by submitting a free parking ticket received at the shop, which may have been received earlier via NFC target terminal B 30 or NFC target terminal A 20.

Thus, where NFC terminal 10 and the NFC target terminal C 40 connect to each other via NFC, the NFC target terminal C 40 may ascertain from previous interactions that the NFC terminal 10 has already paid for parking, or has a voucher showing that it has done so. Thus, status information may be dynamically updated during the previous interactions with other target terminals, so that other NFC target terminals may access this updated service information list.

The NFC terminal 10 transmits an updated service list which may contain a service list, evidencing that the parking ticket has been paid or vouched for.

If this verification is completed, the NFC target terminal C 40 provides free parking, and transmits information (a purchased product list, arrival time, parking termination time, or the like) of the user to the server so that the information may be stored in the server.

When the user visits the department store again, the server may analyze shopping patterns of the user based on the transmitted information to provide customized service, or may provide a benefit, such as discount or the like to the user according to the service usage result of the user.

Thus, information exchange between NFC terminals may be realized, and security may be provided by using the above disclosed techniques. In addition, the present disclosure is not limited to the case where one NFC terminal connects to another NFC terminal, but it may provide various kinds of service under various situations where a NFC terminal may exchange data with a plurality of NFC target terminals connected at one time.

Thus, data shared between a single service via multiple NFC terminals may be integrally managed without any servers, since prototype service-associated information is updated and exchanged through communication protocols among a NFC terminal and a plurality of NFC target terminals.

In addition, by using the above, additional services corresponding to the existing service used of the NFC terminal may be provided and generated, which allows an integrated service to be provided to the NFC terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
    a data receiving unit to receive data from a first target terminal via near field communication (NFC); and
    a data processing unit to process service information from the data received from the data receiving unit,
    wherein if the data receiving unit communicates with the first target terminal, the data processing unit updates the service information,
    wherein the service information comprises a standardized format, and
    wherein the service information comprises:
    a region to store commands for the data processing unit;
    an authority status;
    an identification for the terminal;
    a list of the services provided; and
    an availability of the services provided.

2. The terminal according to claim 1, further comprising a data storing unit to store the service information.

3. The terminal according to claim 1, wherein the data receiving unit receives second data from a second target terminal via near field communication (NFC), and
    the data processing unit updates the service information with the second data.

4. The terminal according to claim 3, further comprising a data transmitting unit to transmit updated service information to the second target terminal.

5. The terminal according to claim 1, wherein the service information is a record of a payment made by the terminal.

6. The terminal according to claim 1, further comprising a service status processing unit to manage a status of the service information based on a usable time associated with the service information.

7. A method for communicating data via near field communication (NFC), comprising:
    establishing a connection via NFC;
    receiving data via NFC;
    determining if a service is provided from the data;
    if a service is provided, determining if a service usage history information update is set;
    if a service usage history information update is set, updating the service information of the provided service; and
    if the service usage history information update is not set, initializing the service information.

8. The method according to claim 7, wherein the service is provided by at least two target terminals.

9. The method according to claim 7, further comprising:
    communicating the data between a terminal and a first target terminal via NFC;
    providing the service if the terminal is in NFC range with the first target terminal, the service being associated with the service information; and
    updating the service information during the providing of the service.

10. The method according to claim 9, further comprising:
    communicating the data between the terminal and a second target terminal NFC;
    providing the service from the second data if the terminal is in NFC range with the second target terminal, the service being associated with the service information; and
    updating the service information during the providing of the service from the second target terminal.

11. The method according to claim 9, further comprising managing a status of the service information based on a usable time associated with the service information.

12. The method according to claim 9, further comprising:
    allowing a user to set a tag to bypass updating; and
    bypassing the updating of the service information based on the set tag.

13. The method according to claim 7, further comprising storing the service information.

14. A system to provide a service from a service provider, the system comprising:
    a terminal with near field communication (NFC) capability;
    wherein the terminal communicates with a first target terminal that provides the service,
    wherein the terminal communicates with the first target terminal via NFC, and receives the service from the first target terminal via NFC, and updates service information associated with the service, wherein the service information comprises a standardized format, and wherein the service information comprises:

a region to store commands for a processor;

an authority status;

an identification for the terminal;

a list of the services provided; and an availability of the services provided.

15. The system according to claim 14, wherein the terminal further comprises a storage unit to store the service information.

16. The system according to claim 14, wherein the terminal communicates with a second target terminal that provides the service, wherein the terminal communicates with the second target terminal via NFC, and receives the service from the second target terminal via NFC, and updates the service information associated with the service.

17. The system according to claim 16, wherein the terminal further comprises a data transmitting unit to transmit updated service information to the second target terminal.

18. The system according to claim 14, wherein the terminal further comprises a service status processing unit to manage a status of the service information based on a usable time associated with the service information.

* * * * *